(12) United States Patent
Urushibara et al.

(10) Patent No.: US 6,330,219 B1
(45) Date of Patent: Dec. 11, 2001

(54) DISK RECORDING/REPRODUCING DEVICE

(75) Inventors: Kenji Urushibara, Fukui-ken; Akira Matsumoto, Yokohama; Makoto Doi, Ishikawa-ken; Isamu Nakade, Kaga, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/047,524

(22) Filed: Mar. 25, 1998

(30) Foreign Application Priority Data

Mar. 26, 1997 (JP) .................................................. 9-089931

(51) Int. Cl.⁷ .................................................. G11B 23/00
(52) U.S. Cl. ............................................................ 369/258
(58) Field of Search ..................................... 369/220, 258

(56) References Cited

U.S. PATENT DOCUMENTS

| 5,166,920 | * | 11/1992 | Kogure ................................. 369/270 |
| 5,761,185 | * | 6/1998 | Horiguchi et al. .................... 369/270 |
| 5,774,445 | * | 6/1998 | Sawi et al. ............................ 369/270 |

FOREIGN PATENT DOCUMENTS

| 0 700 040 A2 | 3/1996 | (EP) . |
| 2 251 116 A | 6/1992 | (GB) . |
| 8-180565 | 7/1996 | (JP) . |

\* cited by examiner

Primary Examiner—David Davis
(74) Attorney, Agent, or Firm—Parkhurst & Wendel, L.L.P.

(57) ABSTRACT

A disk recording/reproducing device includes a power transmitting mechanism which transmits movement of a pickup while engaging with the pickup, and a disk retaining mechanism which, in response to the movement of the pickup transmitted by the power transmitting mechanism, retains a disk on a turntable or releases retention of the disk. Radially inward movement of the pickup causes the disk retaining mechanism to retain the disk on the turntable, while radially outward movement of the pickup causes the disk retaining mechanism to release retention of the disk. For accomplishing the release of the retention of the disk upon the radially outward movement of the pickup, an operation switching mechanism is provided for changing a position of the power transmitting mechanism to cause the power transmitting mechanism to engage with the pickup upon the radially outward movement of the pickup.

9 Claims, 11 Drawing Sheets

DISK RECORDING/REPRODUCING DEVICE

BACKGROUND OF THE INVENTION

1. Field of the Invention

The present invention relates to a disk recording/reproducing device for performing recording/reproducing relative to a recording/reproducing disk, such as a compact disk.

2. Description of the Prior Art

In a known disk recording/reproducing device, a disk is pressed onto a turntable by a movable presser member so that the disk is held on the turntable due to a frictional force caused by a pressing force of the presser member. In another known disk recording/reproducing device, a center hole of a disk is matched with a fitting part of a turntable and then the disk is forcibly pressed onto the turntable manually or by means of a loading/unloading mechanism so that a plurality of retaining members urgingly engage with an inner periphery (defining the center hole) of the disk to retain the disk on the turntable.

JP-A-8-180565 describes another disk recording/reproducing device, which will be explained hereinbelow with reference to FIGS. 11A to 11C.

In FIGS. 11A to 11C, numeral 24 denotes a turntable for retaining a disk (not shown) at a disk positioning portion 29 and rotating it. Numeral 25 denotes retaining members radially arranged along the circumference of the disk positioning portion 29 of the turntable 24. Each of the retaining members 25 can move forward (radially outward) and backward (radially inward) and, upon moving forward, the retaining members 25 engage with the inner periphery (defining a center hole) of the disk so as to retain the disk on the turntable 24. Numeral 26 denotes a loading/unloading member comprising a shaft member 30 received in an elongate hole of the turntable 24 and an engaging portion projected from the circumference of the turntable 24. The loading/unloading member 26 is rotatable relative to the turntable 24 at a given angle by operating the engaging portion.

Now, an operation of the disk recording/reproducing device shown in FIGS. 11A to 11C will be explained. First, during forward rotation of the turntable 24, a stopper (not shown) integral with a pickup is moved from the right in the figures to engage with the engaging portion of the loading/unloading member 26. This causes the retaining members 25 to advance or move forward so that the disk is retained on the turntable 24. On the other hand, during reverse rotation of the turntable 24, the engaging portion of the loading/unloading member 26 engages with the stopper of the pickup in a reverse direction. This causes the retaining members 25 to retreat or move backward so that the disk is released.

In the foregoing prior art using the presser member, the presser member as well as a vertical external force for pressing the presser member toward the turntable are required. Moreover, a space is required in the device for movement of the presser member for loading/unloading the disk.

Further, in the foregoing prior art where the disk is forcibly pressed onto the turntable and retained by the retaining members, external forces are required for loading/unloading the disk. Moreover, since the disk is subjected to warp upon loading/unloading, long strokes are required in vertical directions. This necessitates provision of a large space in the device, and renders the loading of the disk unreliable.

Further, in the structure of JP-A-8-180565, since the forward and backward movement of the retaining members 25 is carried out based on rotation of the disk, it is possible that a hand, the loading/unloading mechanism or other components may come in contact with a recording surface of the disk upon loading/unloading the disk. If it occurs, a flow may be caused extensively on the disk to disable recording/reproducing relative to the disk.

SUMMARY OF THE INVENTION

Therefore, it is an object of the present invention to provide an improved disk producing/reproducing device that can eliminate one or more of the disadvantages inherent in the foregoing prior art structures.

According to one aspect of the present invention, a disk recording/reproducing device comprises a power transmitting mechanism which transmits movement of a pickup while engaging with the pickup; and a disk retaining mechanism which, in response to the movement of the pickup transmitted by the power transmitting mechanism, retains a disk on a turntable or releases retention of the disk.

It may be arranged that the disk recording/reproducing device further comprises an operation switching mechanism for switching a position of the power transmitting mechanism between a first position where engagement between the power transmitting mechanism and the pickup occurs upon radially outward movement of the pickup relative to the disk on the turntable and a second position where no such engagement occurs upon such radially outward movement of the pickup, and that the operation switching mechanism switches the position of the power transmitting mechanism to the first position upon such radially outward movement of the pickup so as to release the retention of the disk on the turntable via the disk retaining mechanism by causing the engagement between the power transmitting mechanism and the pickup.

It may be arranged that the disk retaining mechanism comprises the turntable, a cam member and a disk retaining member which, upon moving forward, engages with an inner periphery of the disk on the turntable so as to retain the disk on the turntable and, upon moving backward, disengages from the inner periphery so as to release the retention of the disk, that the power transmitting mechanism prohibits rotation of the turntable when the pickup moves radially outward relative to the disk on the turntable while engaging with the power transmitting mechanism, and allows the cam member to rotate in a first direction relative to the turntable so as to move backward the disk retaining member, and that the power transmitting mechanism allows the cam member to rotate in a second direction, opposite to the first direction, relative to the turntable so as to move forward the disk retaining member when the pickup moves radially inward relative to the disk on the turntable, and further allows the rotation of the turntable.

It may be arranged that the disk recording/reproducing device further comprises a spring for urging the cam member in the second direction, that the power transmitting mechanism engages with the cam member to rotate it in the first direction against an urging force of the spring, and that the power transmitting mechanism disengages from the cam member to allow the spring to rotate the cam member in the second direction.

It may be arranged that the cam member has a curved slot receiving the disk retaining member therethrough so that the disk retaining member moves forward when the cam member rotates in the second direction, while moves backward when the cam member rotates in the first direction.

It may be arranged that the cam member and the turntable are arranged to rotate concentrically with each other, that the turntable has a slot extending in a radial direction thereof, and that the disk retaining member passes through the curved slot of the cam member and the slot of the turntable.

It may be arranged that the power transmitting mechanism comprises a power input member for transmitting the movement of the pickup in a radially inward or outward direction relative to the disk on the turntable, and a power output member for, in response to an operation of the power input member, causing the disk retaining mechanism to retain the disk on the turntable during a disk recording/reproducing operation or release the retention of the disk otherwise, and that the power transmitting mechanism further comprises an urging member for urging one end of the power input member to retreat the power input member outside a travel path of the pickup during the disk recording/reproducing operation so that engagement between the pickup and the power input member is prevented during the disk recording/reproducing operation.

It may be arranged that the disk retaining mechanism comprises a power conversion member and a disk retaining member which, upon moving forward, engages with an inner periphery of the disk on the turntable so as to retain the disk on the turntable and, upon moving backward, disengages from the inner periphery so as to release the retention of the disk, that the power transmitting mechanism moves the power conversion member in a first direction when the pickup moves radially outward relative to the disk on the turntable while engaging with the power transmitting mechanism, so as to move backward the disk retaining member, and that the power transmitting mechanism moves the power conversion member in a second direction opposite to the first direction when the pickup moves radially inward relative to the disk on the turntable, so as to move forward the disk retaining member.

It may be arranged that the disk retaining member has an inclined surface and the power conversion member has a corresponding inclined surface which are in slidable engagement with each other, that the first direction is a first vertical direction and the second direction is a second vertical direction, and vertical movement of the disk retaining member is prohibited, and that the disk retaining member moves forward or backward upon vertical movement of the power conversion member due to relative sliding movement between the inclined surfaces of the disk retaining member and the power conversion member.

BRIEF DESCRIPTION OF THE DRAWINGS

The present invention will be understood more fully from the detailed description given hereinbelow, taken in conjunction with the accompanying drawings.

In the drawings:

FIGS. 1A and 1B are schematic diagrams showing a structure of a disk recording/reproducing device according to a first preferred embodiment of the present invention, wherein FIG. 1A is a plan view and FIG. 1B is a side view;

FIGS. 2A and 2B are diagrams showing a detailed structure of a disk retaining mechanism shown in FIGS. 1A and 1B, wherein FIG. 2A is a plan view showing a standby state (retaining members retreated) before retaining a disk, and FIG. 2B is a sectional view taken along line A—A in FIG. 2A;

FIGS. 3A and 3B are diagrams showing a detailed structure of the disk retaining mechanism shown in FIGS. 1A and 1B, wherein FIG. 3A is a plan view showing a disk recording/reproducing state (retaining members advanced) retaining the disk, and FIG. 3B is a sectional view of the disk retaining mechanism shown in FIG. 3A.

FIGS. 10A and 10B are schematic diagrams showing a structure of a disk retaining mechanism of a disk recording/reproducing device according to a second preferred embodiment of the present invention, wherein FIG. 10A is a sectional view showing a standby state (retaining members retreated) before retaining the disk, and FIG. 10B is a sectional view showing a disk recording/reproducing state (retaining members advanced) retaining the disk; and FIGS. 11A to 11C are schematic diagrams showing a structure of a disk retaining mechanism of a conventional disk recording/reproducing device, wherein FIG. 11A is a plan view, FIG. 11B is a sectional view showing a disk recording/reproducing state (retaining members advanced) retaining the disk, and FIG. 11C is a sectional view showing a standby state (retaining members retreated) before retaining the disk.

DESCRIPTION OF THE PREFERRED EMBODIMENT

Now, preferred embodiments of the present invention will be described hereinbelow with reference to the accompanying drawings.

First Embodiment

With reference to FIGS. 1A to 7, a structure of a disk recording/reproducing device according to the first preferred embodiment will be described in detail.

Figure 1A:
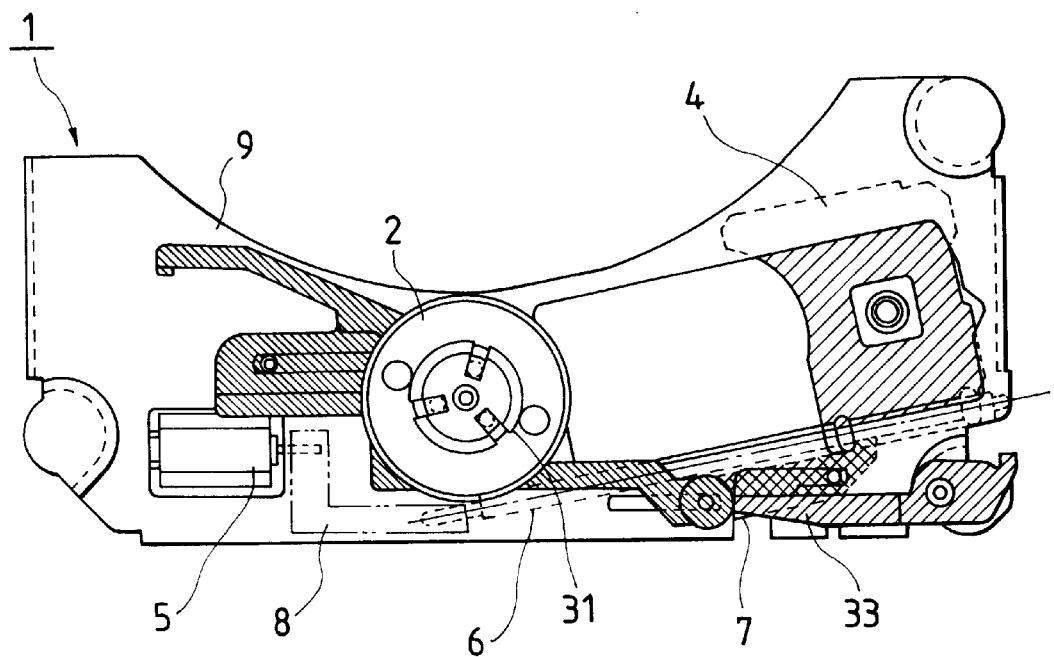
Figure 1B:
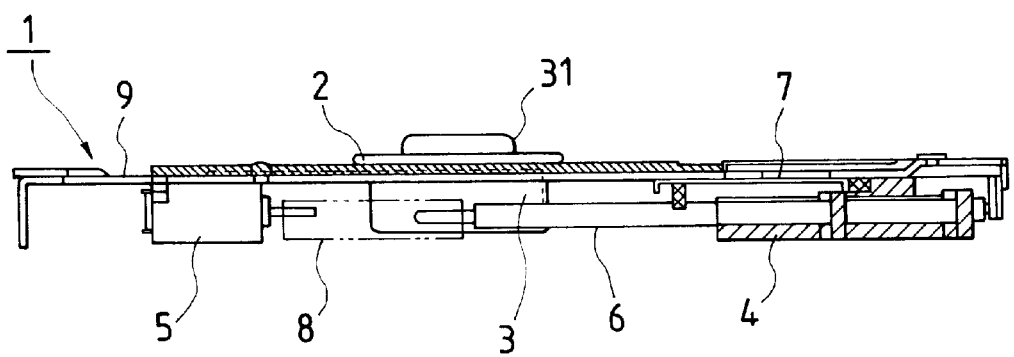
Figure 2A:
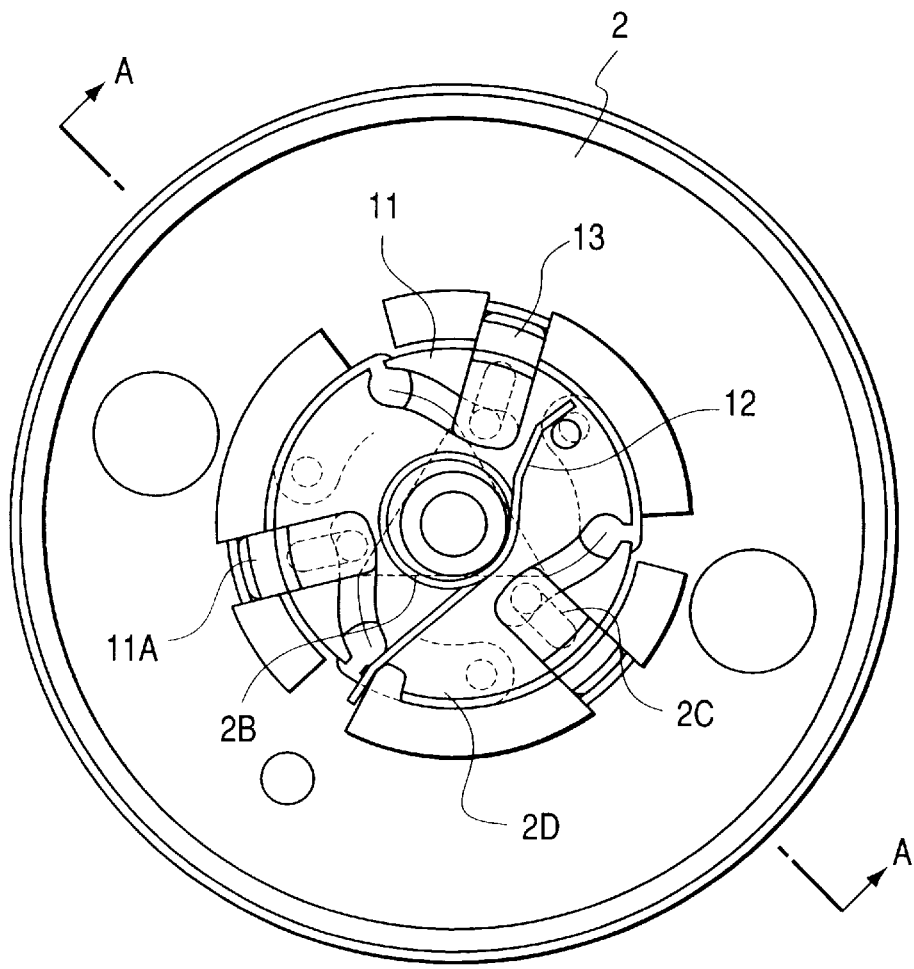
Figure 2B:
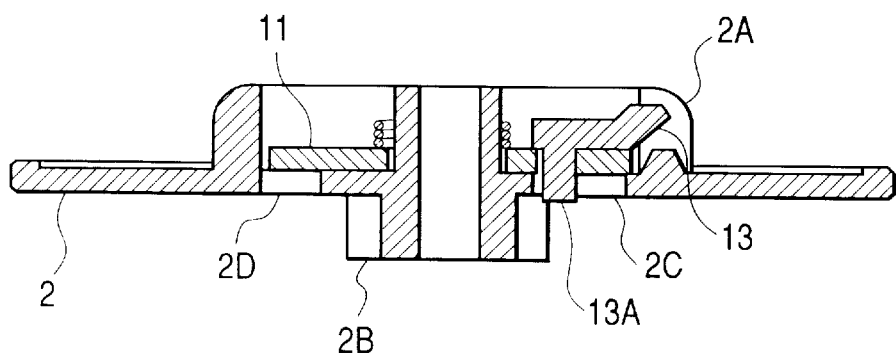

In FIGS. 1A and 1B, numeral 1 denotes a disk recording/reproducing device. The device 1 comprises a turntable 2 for loading thereon a disk 10 (FIG. 3B), a turntable driving motor 3, a pickup 4 for performing writing/reproducing relative to the disk 10, a pickup driving motor 5 and a lead screw 6 for transmitting a driving force of the pickup driving motor 5 to the pickup 4.

The device 1 further comprises a power transmitting mechanism 7 (to be described later in detail with reference to FIG. 4), a gear train 8 for transmitting the driving force of the pickup driving motor 5 to the lead screw 6, a disk retaining mechanism 31 (to be described later in detail with reference to FIGS. 2A to 3B) for retaining the disk 10 on the turntable 2, an operation switching mechanism 33 (to be described later in detail with reference to FIGS. 6 and 7) for switching an operation of the power transmitting mechanism 7 according to an operating state of the device 1, and a base 9 for installing thereon the forgoing components.

With the foregoing arrangement, the driving force of the pickup driving motor 5, which turns on/off under the control of a control unit (not shown), is transmitted to the lead screw 6 via the gear train 8 having any proper structure. Thus, the lead screw 6 is rotated to move the pickup 4. In this embodiment, the pickup 4 is moved by the driving force transmitted from the pickup driving motor 5 via the lead screw 6. However, any other proper arrangement, such as a rack-and-pinion arrangement or an arrangement using a linear motor, may be applied to move the pickup 4.

Now, referring to FIGS. 2A to 3B, the disk retaining mechanism 31 will be described in detail. In the figures, the disk retaining mechanism 31 comprises the turntable 2, a cam member 11 concentric with the turntable 2 and having a plurality of (three in this embodiment) cylindrical portions 11B each extending downward, a spring 12 constantly urging the cam member 11 clockwise, and a plurality of (three in this embodiment) retaining members 13 each having a cylindrical portion 13A extending downward. Each of the retaining members 13 advances or moves forward (radially outward relative to the turntable 2 or the disk 10 on the turntable 2) to retain the disk 10 on the turntable 2 when the cam member 11 is rotated clockwise due to a biasing force of the spring 12, while retreats or moves backward (radially inward relative to the turntable 2 or the disk 10 on the turntable 2) to release retention of the disk 10 when the cam member 11 is rotated counterclockwise against the biasing force of the spring 12.

The turntable 2 comprises a disk positioning portion 2A for positioning the disk 10 by engagement with an inner periphery, defining a center hole, of the disk 10, and a turntable positioning portion 2B having a triangular shape in plan view and positioning the turntable 2 for loading/unloading the disk 10 on the turntable 2. The turntable 2 further comprises a plurality of (three in this embodiment) cam slots 2C each extending radially and receiving therethrough the cylindrical portion 13A of the corresponding retaining member 13 for the foregoing forward or backward movement of the retaining member 13, and a plurality of (three in this embodiment) cam slots 2D each extending circumferentially and receiving therethrough the corresponding cylindrical member 11B of the cam member 11 for allowing the cam member 11 to rotate by a given angle relative to the turntable 2.

The cam member 11 comprises a plurality of (three in this embodiment) curved cam slots 11A each receiving therethrough the cylindrical portion 13A of the corresponding retaining member 13 for moving forward or backward the retaining member 13 in cooperation with the corresponding cam slot 2C of the turntable 2 upon clockwise or counterclockwise rotation of the cam member 11 by the given angle. The cam member 11 further comprises the cylindrical portions 11B each received through the corresponding cam slot 2D of the turntable 2 for rotating the cam member 11 counterclockwise by the given angle relative to the turntable 2 when pushed by a taper portion 14A (to be described later in detail with reference to FIG. 4) against the biasing force of the spring 12.

As described above, the cylindrical portion 13A of each retaining member 13 is received through the corresponding cam slot 11A of the cam member 11 and further through the corresponding cam slot 2C of the turntable 2, and moved radially outward relative to the cam member 11 along the cam slots 11A and 2C when the cam member 11 is rotated clockwise by the biasing force of the spring 12. This causes each retaining member 13 to abut against the inner periphery (defining the center hole) of the disk 10 so as to retain the disk 10 on the turntable 2.

In the foregoing manner, the retaining members 13 are moved forward and backward by means of the rotation of the cam member 11. In this embodiment, the triangular turntable positioning member 2B is positioned such that one side of the triangle is retained by an upper side, in FIG. 4, of the taper portion 14A of a power output member 14 (to be described later in detail with reference to FIG. 4) when the power output member 14 moves to the right in FIG. 1. Further, the cam member 11 is positioned such that when the taper portion 14A moves to the right in FIG. 1, an inclined surface of the taper portion 14A presses one of the cylindrical portions 11B to rotate the cam member 11 counterclockwise.

Figure 4:
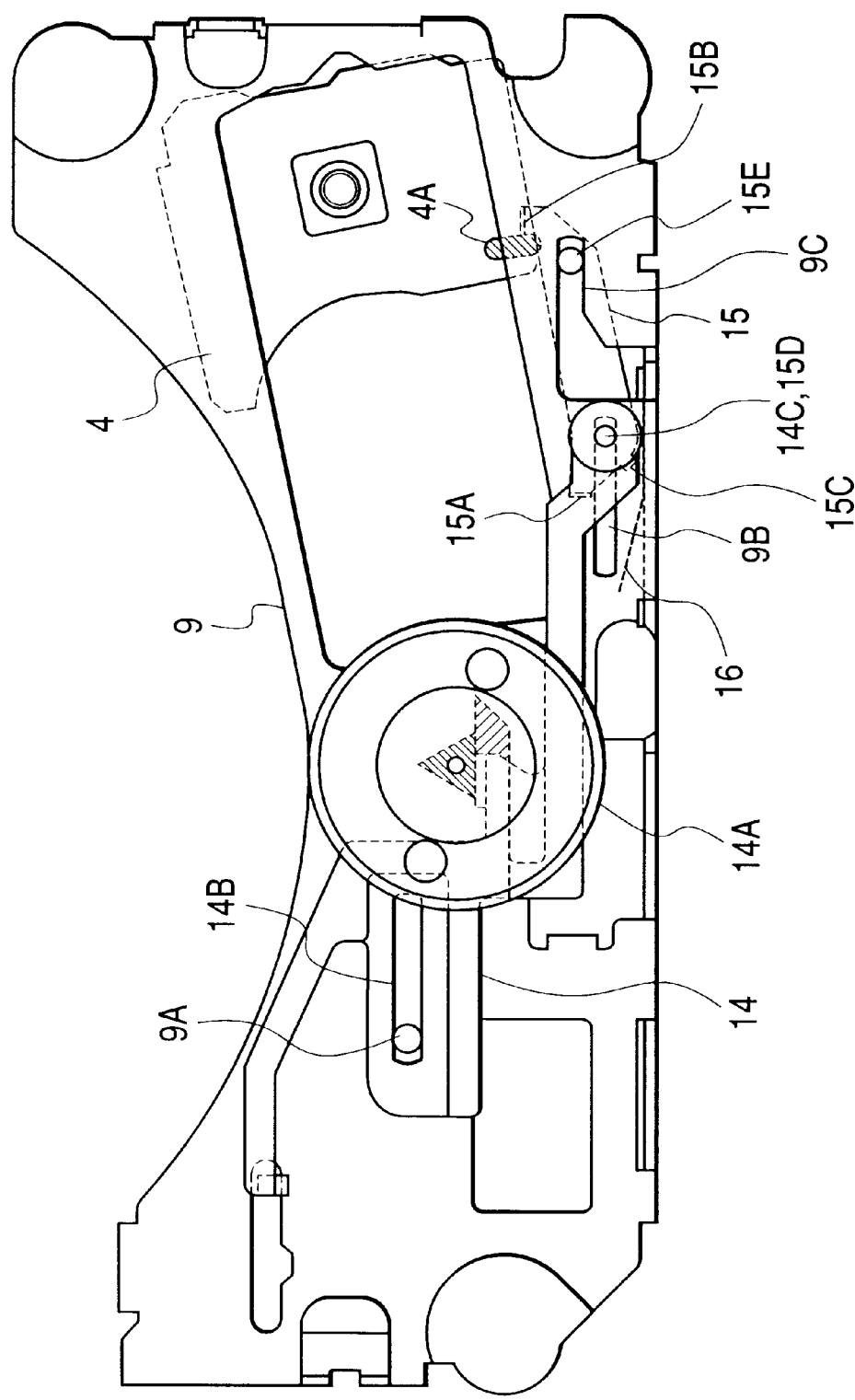
FIG. 4 is a plan view showing a detailed structure of a power transmitting mechanism, shown in FIGS. 1A and 1B, in a standby state before retaining the disk.
Figure 5:
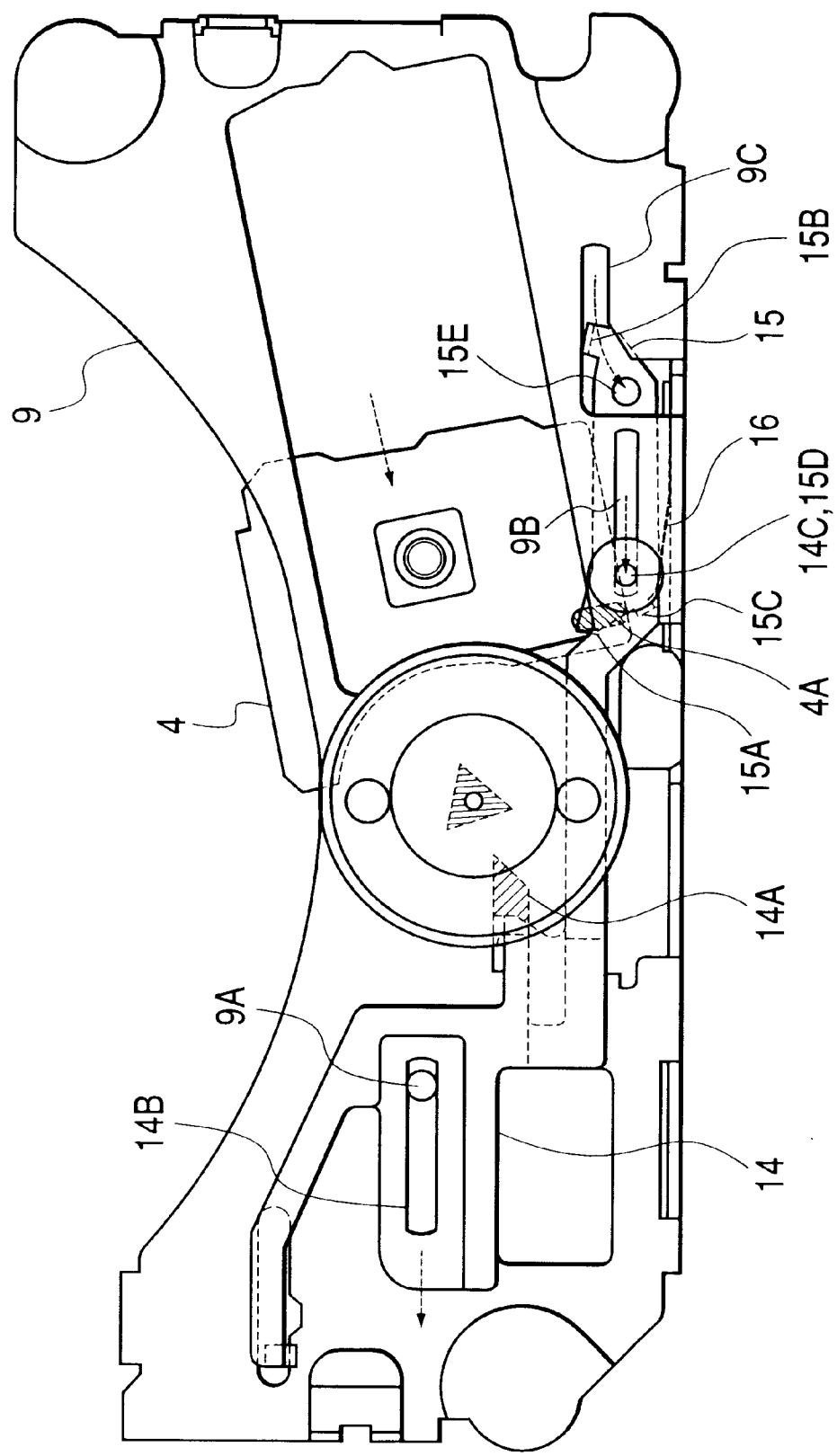
FIG. 5 is a plan view showing a detailed structure of the power transmitting mechanism, shown in FIGS. 1A and 1B, in a disk recording/reproducing state retaining the disk.

Referring now to FIGS. 4 and 5, a structure of the power transmitting mechanism 7 will be described in detail. In FIGS. 4 and 5, the power transmitting mechanism 7 comprises a power input member 15 and the power output member 14 for transmitting the movement or power of the pickup 4 to the turntable 2, and an urging member 16 for retreating a pickup engaging portion 15B of the power input member 15 from a travel path of a projection 4A of the pickup 4 in a recording/reproducing state of the device 1. The urging member 16 is in the form of a plate spring in this embodiment, but may be in the form of any proper elastic member.

The power output member 14 comprises the foregoing taper portion 14A, an elongate hole 14B and a round hole 14C. The elongate hole 14B slidably receives therethrough a shaft member 9A of the base 9. Upon loading/unloading the disk 10, the taper portion 14 engages with one side of the triangular turntable positioning portion 2B to prohibit rotation of the turntable 2 and further engages with one of the cylindrical portions 11B of the cam member 11 to rotate the cam member 11 counterclockwise by the given angle relative to the turntable 2. The power input member 15 comprises an pickup engaging portion 15A and the pickup engaging portion 15B which are engageable with the projection 4A of the pickup 4. The power input member 15 further comprises an urge portion 15C engageable with the urging member 16, and a shaft member 15D located near the urge portion 15C. The shaft member 15D is movably received through an elongate hole 9B of the base 9 and further rotatably received through the round hole 14C of the power output member 14.

The power input member 15 further comprises a shaft member 15E movably received through a cam slot 9C of the base 9. One end of the urging member 16 is fixed to the base 9, and its other end engages with the urge portion 15C of the power input member 15 upon movement of the power input member 15 to the right in FIGS. 4 and 5 so as to press and rotate the power input member 15 clockwise about the shaft member 15D.

Figure 6:
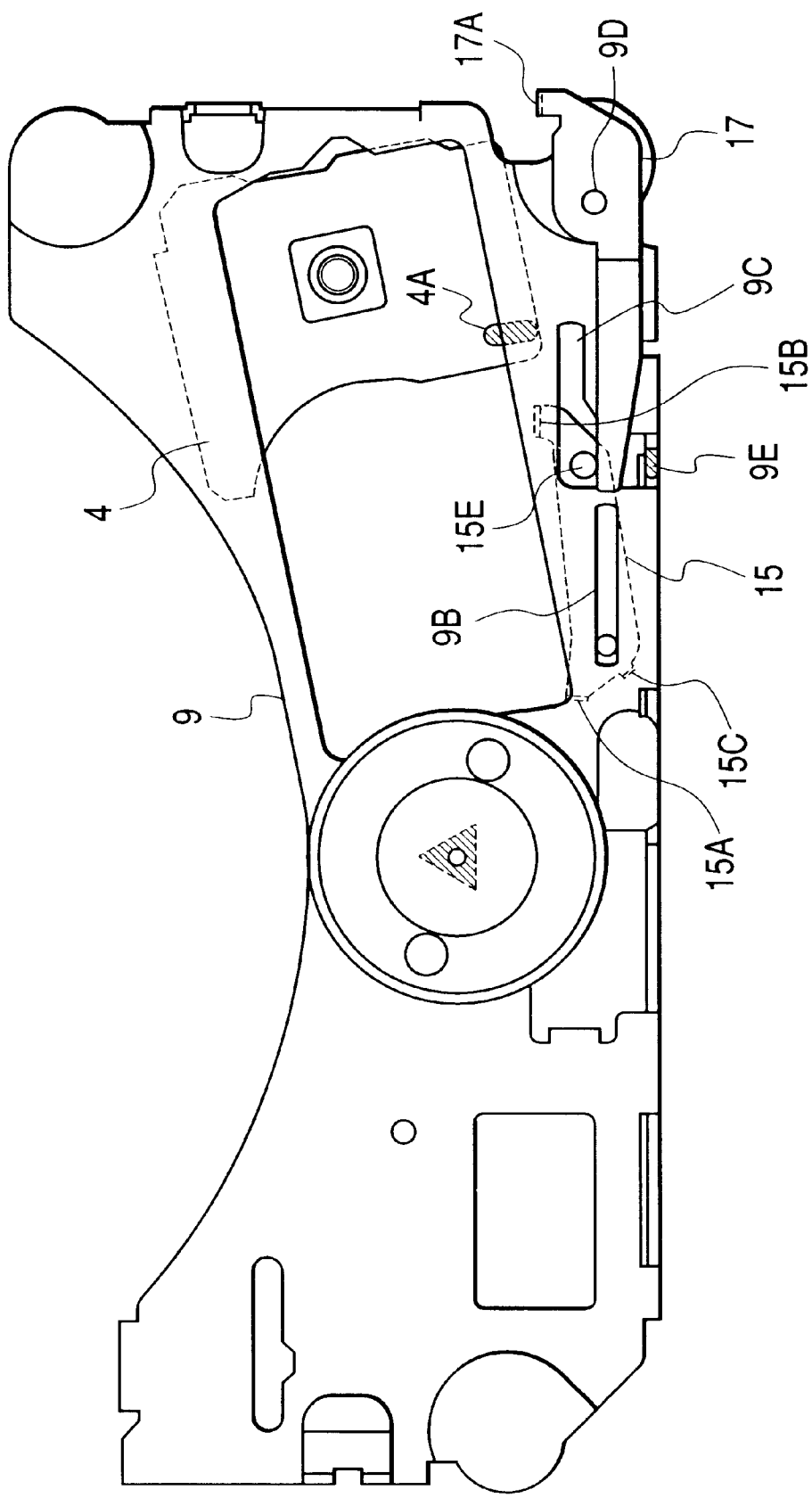
FIG. 6 is a plan view showing a detailed structure of an operation switching mechanism, shown in FIGS. 1A and 1B, while releasing retention of the disk.
Figure 7:
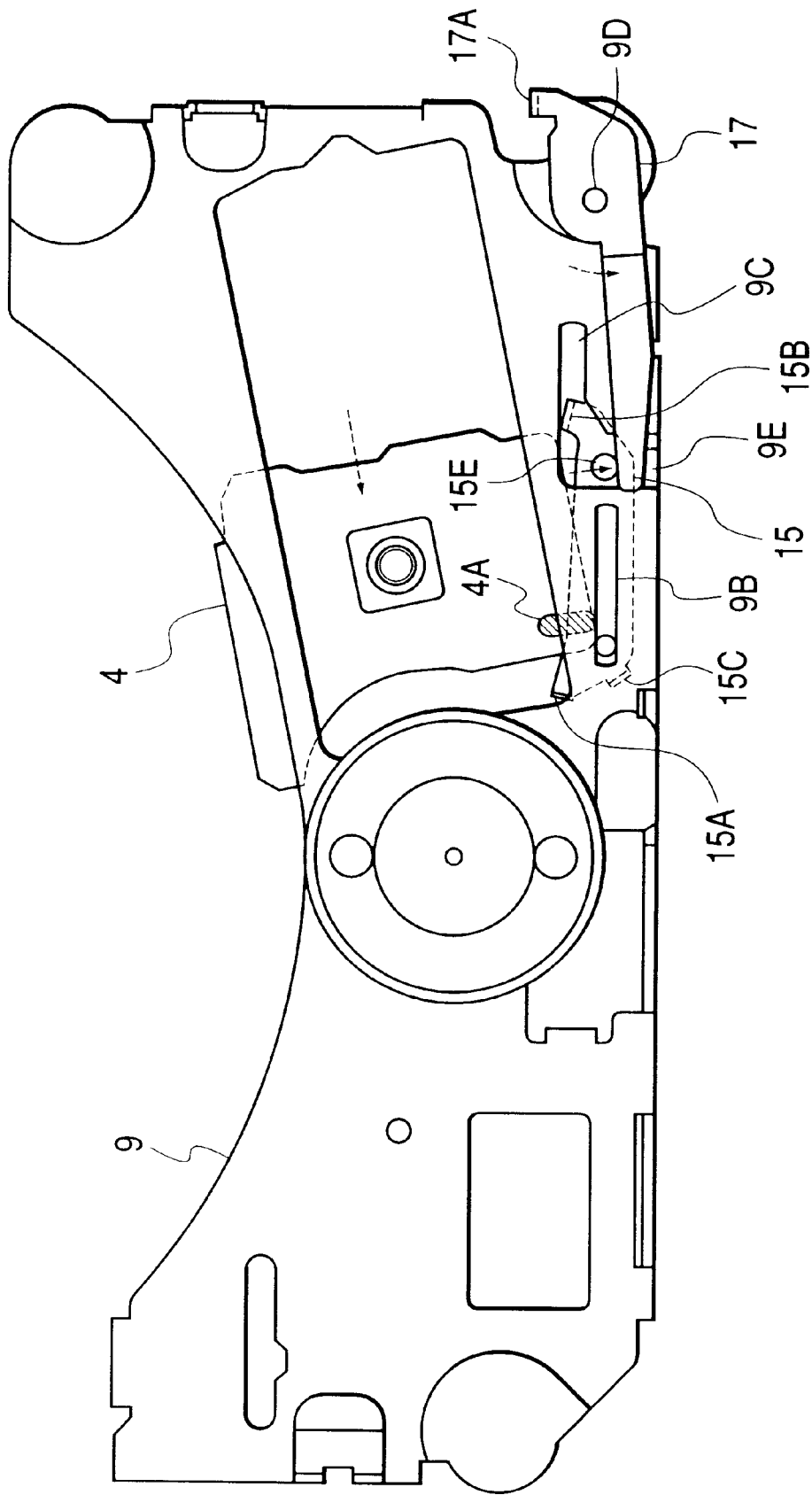
FIG. 7 is a plan view showing a detailed structure of the operation switching mechanism, shown in FIGS. 1A and 1B, in a disk recording/reproducing state.

Referring now to FIGS. 6 and 7, a structure of the operation switching mechanism 33 will be described in detail. In FIGS. 6 and 7, the operation mechanism 33 is, in this embodiment, in the form of a rotational member 17 having a projection 17A to be given an external force from a power source (for example, a motor or a solenoid valve also used for another device) outside the disk recording/reproducing device 1. The rotational member 17 is pivotable about a shaft member 9D of the base 9 and engageable, at its left end in the figures, with the shaft member 15E of the power input member 15.

Figure 8:
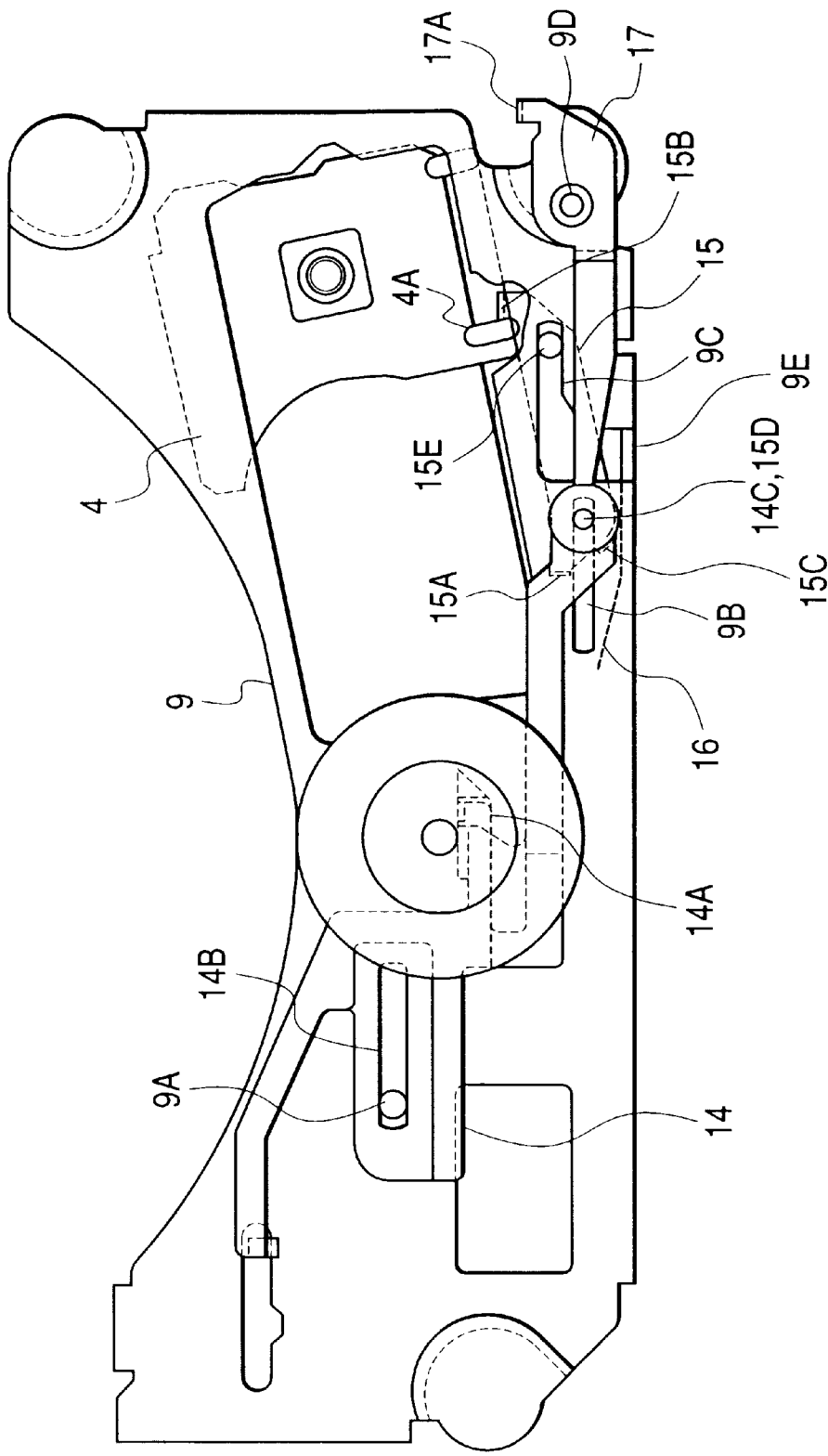
FIG. 8 is a plan view showing a structure of the disk recording/reproducing device, shown in FIGS. 1A and 1B, in an initial operation state (retaining members retreated)

Now, operations of the disk recording/reproducing device having the foregoing structure will be described with reference to FIGS. 8 and 9, in addition to FIGS. 1A to 7.

First, an operation of the device from a standby state to a disk retaining state (where a recording/reproducing operation relative to the disk is performed) will be described. FIG. 8 shows the standby state where the pickup 4 is located radially outside the disk 10. This standby state is accomplished such that the engaging portion 15B of the power input member 15 engages with the projection 4A of the pickup 4 to be moved to the right in the figure, which causes the power output member 14 to move radialy inward relative to the disk 10, that is, to the right in the figure. At this time, as shown in FIG. 4, the taper portion 14A of the power output member 14 contacts with one side of the triangular turntable positioning portion 2B of the turntable 2 to prohibit the rotation of the turntable 2 and rotates the cam member 11 counterclockwise and holds it at that position to enable a user to place or take out the disk 10 on or from the turntable 2.

Specifically, by pressing one of the cylindrical portions 11B of the cam member 11 with the inclined surface of the taper portion 14A while prohibiting the rotation of the turntable 2, the cam member 11 is rotated counterclockwise relative to the turntable 2. As a result, the cylindrical portion 13A of each retaining member 13 is moved backward (toward the center of the turntable 2) along the cam slots 11A and 2C so that each retaining member 13 is retreated into the disk positioning portion 2A of the turntable 2. In this state, the disk 10 can be placed on the turntable 2 with the center hole thereof being fitted with the disk positioning portion 2A. In this embodiment, the taper portion 14A has the inclined surface at the whole tip surface thereof. On the other hand, the tip surface of the taper portion 14A may be partly non-inclined so as to positively press the cylindrical portion 11B.

Then, when a sensor means (not shown) detects that the disk 10 is placed on the turntable 2, the pickup 4 is moved radially inward (to the left in the figure) relative to the disk 10. Then, as shown in FIGS. 5, 7 and 9, the projection 4A of the pickup 4 engages with the pickup engaging portion 15A of the power input member 15 so as to move the power input member 15 to the left in the figures with the shaft members 15D and 15E being guided along the elongate hole 9B and an elongate portion of the cam slot 9C of the base 9, respectively.

Figure 3A:
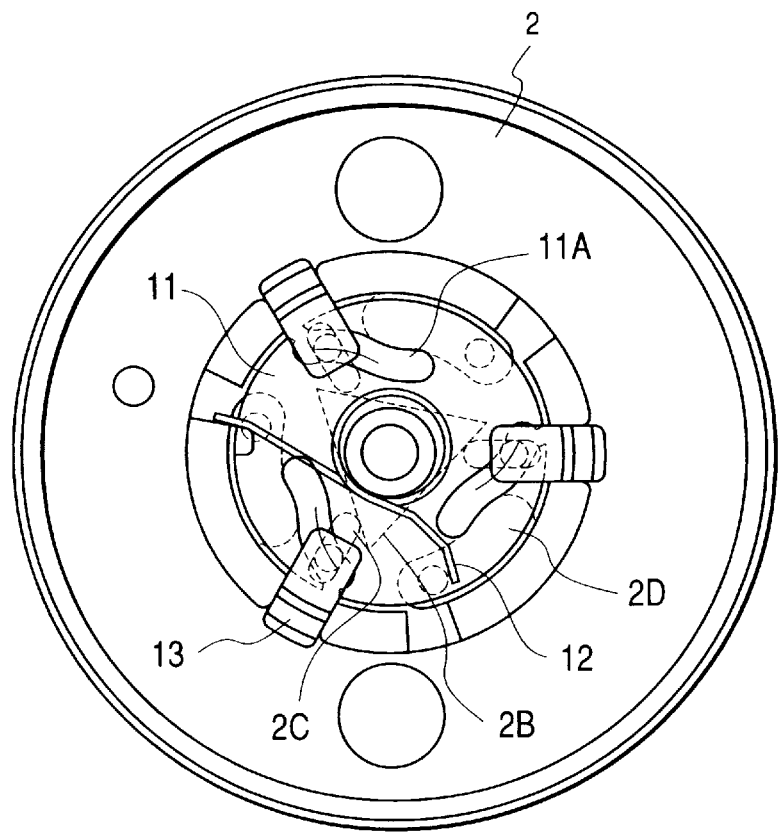
Figure 3B:
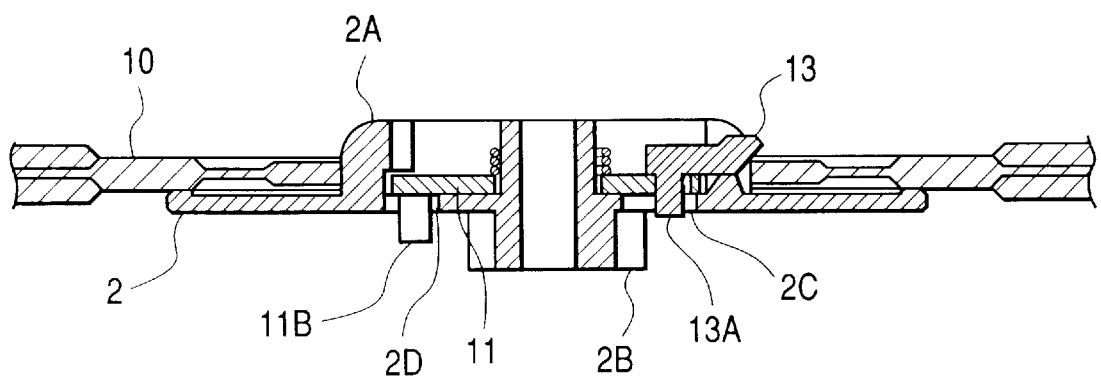

This movement of the power input member 15 causes the power output member 14 to move also to the left in the figures due to the engagement between the shaft member 15D and the round hole 14C of the power output member 14 and using as a guide the shaft member 9A of the base 9 received in the elongate hole 14B of the power output member 14. When the power output member 14 moves to the left in the figures, the constraint to the cylindrical member 11B of the cam member 11 by the taper portion 14A of the power output member 14 is released (FIGS. 3A, 3B). Thus, due to the biasing force of the spring 12, the cam member 11 rotates clockwise relative to and concentrically with the turntable 2.

When the cam member 11 rotates clockwise, the cylindrical portion 13A of each retaining member 13 slides along the corresponding cam slot 11A of the cam member 11 so as to be applied with a radially outward force and thus slides along the corresponding cam slot 2C of the turntable 2 radially outward relative to the disk positioning portion 2A so that each retaining member 13 advances and projects from the circumference of the disk positioning portion 2A. As a result, each retaining member 13 engages with the inner periphery (defining the center hole) of the disk 10 so that the disk 10 is retained on the turntable 2.

When the pickup 4 further moves radially inward relative to the disk 10, the engagement between the taper portion 14A of the power output member 14 and the turntable positioning portion 2B of the turntable 2 is released. Further, as shown in FIGS. 5, 7 and 9, the shaft member 15E of the power input member 15 reaches an enlarged portion, located at a left end in the figures, of the cam slot 9C of the base 9, and the urge portion 15C of the power input member 15 engages with the urging member (plate spring) 16 so as to be urged, so that the power input member 15 rotates clockwise about the shaft member 15D. Thus, the pickup engaging portion 15B of the power input member 15 is retreated outside the travel path of the projection 4A of the pickup 4.

Figure 9:
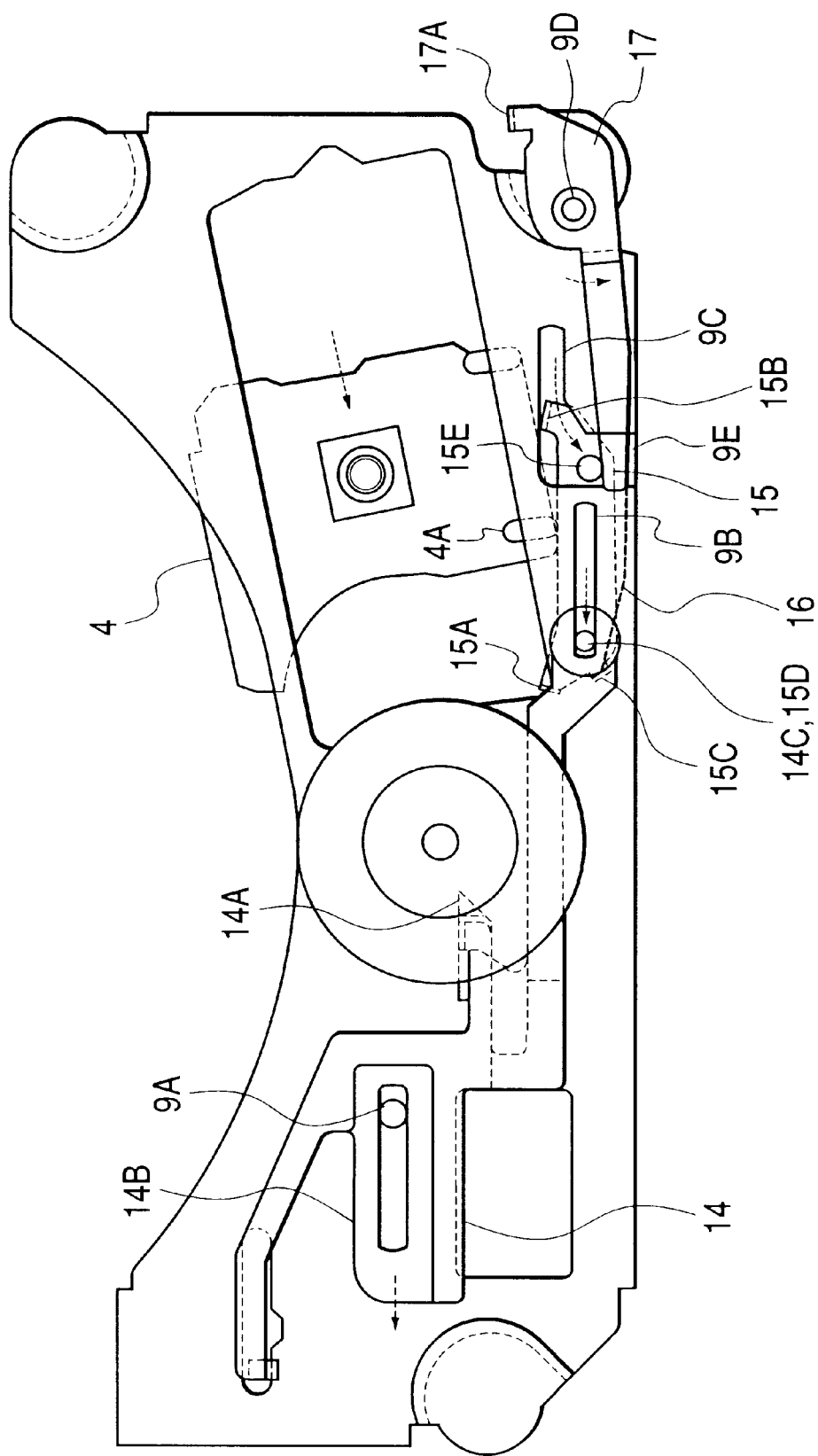
FIG. 9 is a plan view showing a structure of the disk recording/reproducing device, shown in FIGS. 1A and 1B, in a disk recording/reproducing state (retaining members advanced)

Simultaneously, as shown in FIGS. 7 and 9, the shaft member 15E of the power input member 15 engages with the left end of the rotational member 17 to rotate the rotational member 17 counterclockwise about the shaft member 9D. The counterclockwise movement of the rotational member 17 is stopped upon abutment with a stopper 9E of the base 9. Since the shaft member 15E is located in the enlarged portion of the cam slot 9C at a lower portion thereof in the figures and urged against the left end of the rotational member 17, the power input member 15 and the power output member 14 are held at the left in the figures, that is, in the disk retaining state or the disk recording/reproducing state.

Now, an operation of the device in the disk recording/reproducing state will be described. FIG. 9 shows the disk recording/producing state. In this state, as shown in FIGS. 3A and 3B, the constraint of the taper portion 14A of the power output member 14 relative to the turntable positioning portion 2B of the turntable 2 is fully released so that the turntable 2 can be rotated by the turntable driving motor 3. Further, as shown in FIGS. 5, 7 and 9, the power input member 15 is urged by the urging member 16 to rotate clockwise.

In this state, the pickup 4 moves radially inward or outward relative to the disk 10 for carrying out the disk recording/reproducing operation. However, since the pickup engaging portion 15B of the power input member 15 is retreated outside the travel path of the projection 4A of the pickup 4, the pickup 4 does not engage with the pickup engaging portion 15A or 15B. In this state, the turntable 2 is rotated and the pickup 4 is moved so that the recording/reproducing operation relative to the disk 10 can be carried out.

Now, an operation of the device from the disk recording/reproducing state to the release of the disk retaining state will be described. During the disk recording/reproducing operation, the turntable 2 is rotated by the turntable driving motor 3, and the pickup 4 is located at a position in a given allowed displacement range. In response to a command from the control unit (not shown) to stop the disk recording/reproducing operation, the turntable driving motor 3 is stopped so that the rotation of the turntable 2 is also stopped. Following this, the pickup driving motor 5 moves the pickup 4 radially inward relative to the disk 10 and stops it at the innermost position, for example, at the position shown in FIG. 5.

Then, an external force reverse to the biasing direction (counterclockwise) caused by the urging member 16 is applied to the projection 17A of the rotational member 17 as the operation switching mechanism 33, so as to rotate the rotational member 17 clockwise about the shaft member 9D. This causes the shaft member 15E engaging with the left end of the rotational member 17 to move upward in FIG. 9 (toward the travel path of the projection 4A of the pickup 4) so that the power input member 15 is rotated counterclockwise to move the pickup engaging portion 15B to a position within the travel path of the projection 4A of the pickup 4. For the external force applied to the projection 17A of the rotational member 17, the power from a power source (for example, a motor or a solenoid valve also used for another device) outside the disk recording/reproducing device 1 is used.

Subsequently, when the pickup 4 is moved radially outward relative to the disk 10, the projection 4A of the pickup 4 engages with the pickup engaging portion 15B of the power input member 15 to move the power input member 15 and the power output member 14 to the right in FIG. 9. This causes the taper portion 14A of the power output member 14 to engage with the turntable positioning portion 2B to prohibit the rotation of the turntable 2.

Then, the taper portion 14A further engages with one of the cylindrical portions 11B of the cam member 11 to rotate the cam member 11 counterclockwise relative to the turntable 2. This causes the retaining members 13 to be received in the disk positioning portion 2A of the turntable 2, and the movement of the pickup 4 is stopped. In this state, the disk 10 is taken out from the turntable 2 so that the release of the disk retaining state is completed. As appreciated, this state is the same as the foregoing standby state.

In the foregoing first preferred embodiment, one feature resides in that the movement of the pickup 4 is transmitted to the turntable 2 via the power transmitting mechanism 7 and, in response thereto, the disk retaining mechanism 31 retains the disk 10 on the turntable 2 or releases the retention of the disk 10.

Another feature resides in the switching of the power transmitting mechanism 7 from the disk retaining state to the standby state, wherein the external force is applied to the projection 17A of the operation switching mechanism (rotational member 17) 33 upon releasing the retention of the disk 10 so as to move the pickup engaging portion 15B of the power input member 15 to the position where the pickup engaging portion 15B and the projection 4A of the pickup 4 are engageable with each other.

Another feature resides in the disk retaining mechanism 31, which is not of the type of pressing the disk from the side of a recording surface for retention thereof, and wherein the retaining members 13 engaging with the cam member 11 are provided on the turntable 2, and the forward and backward movement of the retaining members 13 is accomplished using, for example, the movement of the pickup 4, and not using the rotation of the turntable 2.

Another feature resides in that the movement of the pickup 4 is transmitted to the turntable 2 using the power input member 15 and the power output member 14 as the power transmitting mechanism 7 to accomplish positioning and retention of the turntable 2, and the retaining members 13 are moved forward (advanced) or backward (retreated) by rotating only the cam member 11 without rotating the turntable 2 so as to retain the disk or release the retention of the disk.

Second Embodiment

Figure 10A:
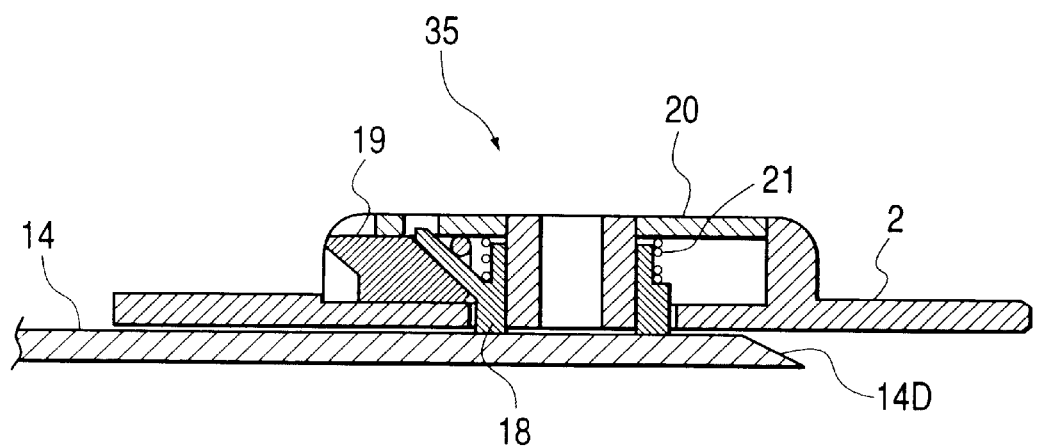
Figure 10B:
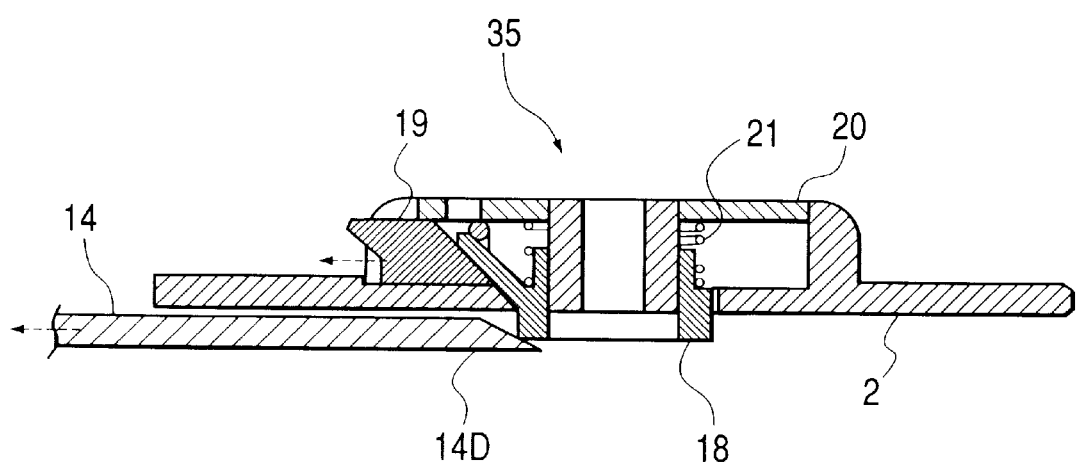
Figure 11A:
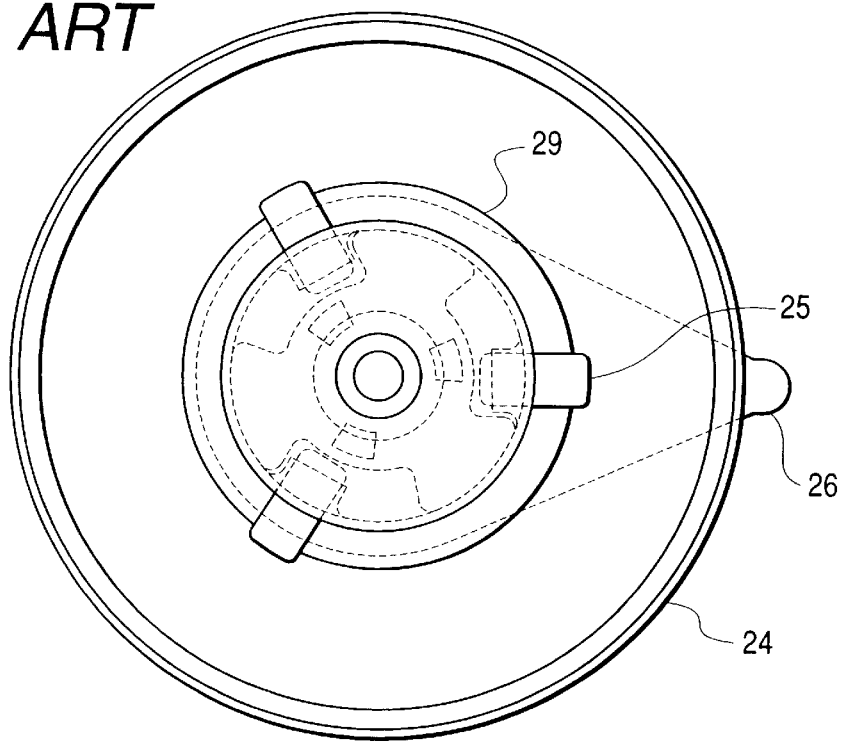
Figure 11B:
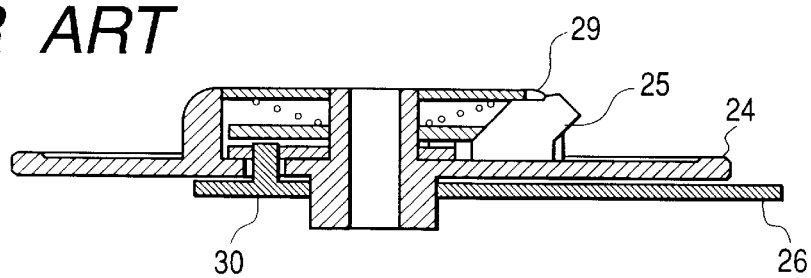
Figure 11C:
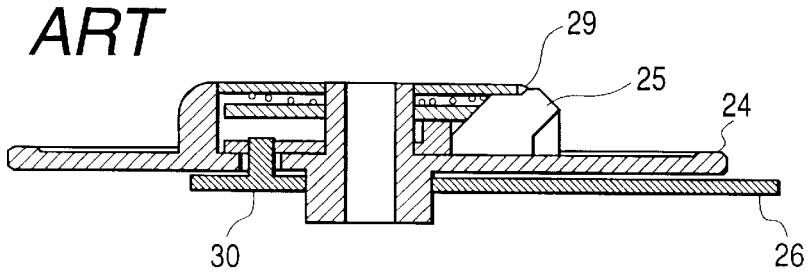

With reference to FIGS. 10A and 10B, a disk recording/reproducing device according to the second preferred embodiment will be described in detail. In this embodiment, a disk retaining mechanism 35 of the device differs from the disk retaining mechanism 31 in the foregoing first preferred embodiment. A structure of the disk retaining mechanism 35 will be described in detail with reference to FIGS. 10A and 10B.

Other than the disk retaining mechanism 35, the structure of the second preferred embodiment is the same as that of the first preferred embodiment except that a power output member 14 in this embodiment is provided, instead of the taper portion 14A in the first preferred embodiment, with a taper portion 14D having an inclined surface which engages with a power conversion member 18 for raising or lowering it.

Instead of the cam member 11, the spring 12 and the retaining members 13 of the disk retaining mechanism 31 in the first preferred embodiment, the disk retaining mechanism 35 in this embodiment comprises the power conversion member 18 movable upward and downward inside a turntable 2 and having a plurality of (three in this embodiment) projections each having an inclined surface, a plurality of (three in this embodiment) retaining members 19 each having an inclined surface engaging with the inclined surface of the corresponding projection of the power conversion member 18, a fixed plate 20 for prohibiting vertical movement of the retaining members 19 in cooperation with the turntable 2, and a spring 21 disposed between the fixed member 20 and the power conversion member 18 for urging the power conversion member 18 downward.

Now, operations of the disk recording/reproducing device in this embodiment will be described with reference to FIGS. 10A and 10B. First, in a standby state shown in FIG. 10A, the power conversion member 18 is raised by the taper portion 14D of the power output member 14 and urged downward by the spring 21. In this state, if the pickup 4 moves radially inward relative to the turntable 2, the power output member 14 moves radially outward relative to the turntable 2 via the power input member 15. This causes the power conversion member 18 to move downward along the inclined surface of the taper portion 14D of the power output member 14.

At this time, however, since each retaining member 19 is prohibited from moving vertically between the turntable 2 and the fixed plate 20, the retaining member 19 moves forward (radially outward) due to relative sliding movement between the inclined surface thereof and the inclined surface of the corresponding projection of the power conversion member 18 to abut against the inner periphery (defining the center hole) of the disk 10 so as to retain the disk 10 on the turntable 2. In this state, like in the first preferred embodiment, the power output member 14 is retreated to a position where no interference is caused relative to the power conversion member 18 and the pickup 4 as shown in FIG. 10B.

On the other hand, for releasing the retention of the disk 10, the pickup 4 is moved radially outward and the retreated power input member 15 is moved to a position for engagement with the projection 4A of the pickup 4, so that the power conversion member 18 is raised due to the engagement with the inclined surface of the taper portion 14D of the power output member 14. This causes the retaining members 19 to retreat toward the center of the turntable 2 so that the retention of the disk 10 is released. Thus, the disk retaining mechanism 35 is returned to the state shown in FIG. 10A.

As described above, in this embodiment, since the retention of the disk and the release thereof can be carried out without rotating the turntable, the disk is prevented from being subjected to a serious damage upon such an occasion. Further, the retention of the disk and the release thereof can be carried out without a special positioning mechanism for the turntable.

According to the foregoing first and second preferred embodiments, the following effects can be achieved:

The normal movement of the pickup is transmitted to the disk retaining mechanism at the turntable via the power transmitting mechanism so as to retain the disk on the turntable or release the retention of the disk.

The disk can be reliably retained on the turntable without the necessity of the presser member, the external force for pressing the presser member toward the turntable, or the space in the device for movement of the presser member for loading/unloading the disk.

Since the operation switching mechanism is provided for switching the operation of the power transmitting mechanism, the disk retaining operation and the disk releasing operation can be both carried out based on the movement of the pickup in the normal range. Thus, the disk loading and unloading operations can be performed in the narrow space.

Since the disk retaining mechanism uses the retaining members responsive to the movement of the pickup transmitted via the power transmitting mechanism, the retention of the disk on the turntable and the release thereof can be accomplished without rotating the turntable, and thus without causing a serious damage to the disk on the turntable.

While the present invention has been described in terms of the preferred embodiments, the invention is not to be limited thereto, but can be embodied in various ways without departing from the principle of the invention as defined in the appended claims.

What is claimed is:

1. A disk recording/reproducing device comprising:
    a power transmitting mechanism which transmits movement of a pickup while engaging with said pickup; and
    a disk retaining mechanism which, in response to the movement of said pickup transmitted by said power transmitting mechanism, retains a disk on a turntable or releases retention of the disk.

2. The disk recording/reproducing device according to claim 1, further comprising an operation switching mechanism for switching a position of said power transmitting mechanism between a first position where engagement between said power transmitting mechanism and said pickup occurs upon radially outward movement of the pickup relative to the disk on the turntable and a second position where no such engagement occurs upon such radially outward movement of the pickup, wherein said operation switching mechanism switches the position of said power transmitting mechanism to said first position upon such radially outward movement of the pickup so as to release the retention of the disk on the turntable via said disk retaining mechanism by causing said engagement between the power transmitting mechanism and the pickup.

3. The disk recording/reproducing device according to claim 1, wherein said disk retaining mechanism comprises said turntable, a cam member and a disk retaining member which, upon moving forward, engages with an inner periphery of the disk on the turntable so as to retain the disk on the turntable and, upon moving backward, disengages from said inner periphery so as to release the retention of the disk, wherein said power transmitting mechanism prohibits rotation of the turntable when said pickup moves radially outward relative to the disk on the turntable while engaging with said power transmitting mechanism, and allows said cam member to rotate in a first direction relative to said turntable so as to move backward said disk retaining member, and wherein said power transmitting mechanism allows said cam member to rotate in a second direction, opposite to said first direction, relative to said turntable so as to move forward said disk retaining member when said pickup moves radially inward relative to the disk on the turntable, and further allows the rotation of the turntable.

4. The disk recording/reproducing device according to claim 3, further comprising a spring for urging said cam member in said second direction, wherein said power transmitting mechanism engages with said cam member to rotate it in said first direction against an urging force of said spring, and wherein said power transmitting mechanism disengages from said cam member to allow said spring to rotate the cam member in said second direction.

5. The disk recording/reproducing device according to claim 3, wherein said cam member has a curved slot receiving said disk retaining member therethrough so that said disk retaining member moves forward when said cam member rotates in said second direction, while moves backward when said cam member rotates in said first direction.

6. The disk recording/reproducing device according to claim 5, wherein said cam member and said turntable are arranged to rotate concentrically with each other, wherein said turntable has a slot extending in a radial direction thereof, and wherein said disk retaining member passes through the curved slot of said cam member and the slot of said turntable.

7. The disk recording/reproducing device according to claim 1, wherein said power transmitting mechanism comprises a power input member for transmitting the movement of said pickup in a radially inward or outward direction relative to the disk on the turntable, and a power output member for, in response to an operation of said power input member, causing said disk retaining mechanism to retain the disk on the turntable during a disk recording/reproducing operation or release the retention of the disk otherwise, and wherein said power transmitting mechanism further comprises an urging member for urging one end of said power input member to retreat said power input member outside a travel path of said pickup during said disk recording/reproducing operation so that engagement between said pickup and said power input member is prevented during said disk recording/reproducing operation.

8. The disk recording/reproducing device according to claim 1, wherein said disk retaining mechanism comprises a power conversion member and a disk retaining member which, upon moving forward, engages with an inner periphery of the disk on the turntable so as to retain the disk on the turntable and, upon moving backward, disengages from said inner periphery so as to release the retention of the disk, wherein said power transmitting mechanism moves said power conversion member in a first direction when said pickup moves radially outward relative to the disk on the turntable while engaging with said power transmitting mechanism, so as to move backward said disk retaining member, and wherein said power transmitting mechanism moves said power conversion member in a second direction opposite to said first direction when said pickup moves radially inward relative to the disk on the turntable, so as to move forward said disk retaining member.

9. The disk recording/reproducing device according to claim 8, wherein said disk retaining member has an inclined surface and said power conversion member has a corresponding inclined surface which are in slidable engagement with each other, wherein said first direction is a first vertical direction and said second direction is a second vertical direction, and vertical movement of said disk retaining member is prohibited, and wherein said disk retaining member moves forward or backward upon vertical movement of said power conversion member due to relative sliding movement between the inclined surfaces of said disk retaining member and said power conversion member.

* * * * *